Dec. 17, 1963  C. H. AUGER  3,114,533
ROTOR CONSTRUCTION
Filed April 27, 1961
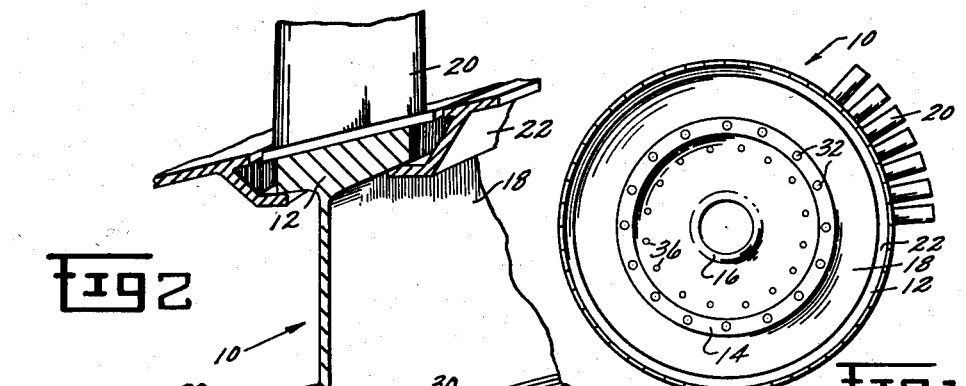
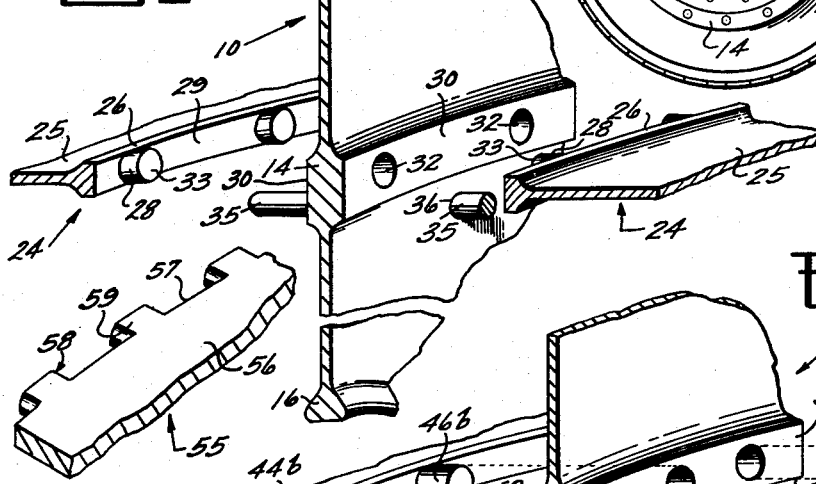
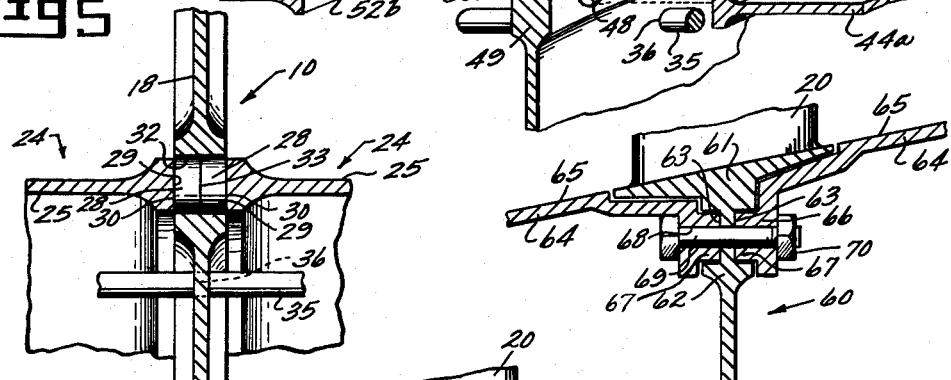
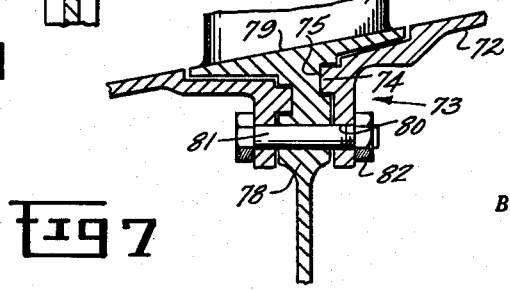
INVENTOR.
CLAUDE H. AUGER
BY
Harry C. Burgess
ATTORNEY

United States Patent Office 3,114,533
Patented Dec. 17, 1963

3,114,533
ROTOR CONSTRUCTION
Claude H. Auger, Cincinnati, Ohio, assignor to General Electric Company, a corporation of New York
Filed Apr. 27, 1961, Ser. No. 106,064
2 Claims. (Cl. 253—39)

This invention relates generally to a rotor construction and, more particularly, to improved means for intercoupling a plurality of blade-carrying disk members in a multistage, axial-flow turbine or compressor rotor, or the like.

There are a number of well-known designs for constructing axial-flow turbine or compressor rotors having a plurality of juxtaposed, blade-carrying wheel disks. Commonly, such designs employ disk coupling means to transmit torque between the individual wheel disks of the rotor. Often the coupling means utilized assists, or is wholly responsible for, maintaining the spacing of the juxtaposed wheel disks. Sometimes the couplings function as heat-shields for the inner area of the rotor. One of the very early attempts to design such couplings consisted of a caulking strip which was driven between the rim of the disk and the adjacent generally cylindrical "spacer," or coupling element, to help form the rotor "spool." Other designs have included axially-extending, face-tooth splines or clutch teeth, having a variety of shapes, and radially-extending, interengaging splines or gear teeth located on adjacent extensions or flanges of "spacers" and wheel disks.

One of the major problems associated with latter-known coupling means has been the relatively high cost of the forging, machining, or grinding operations necessary to form the coupling teeth. Frequently, special machines have been required which can be extremely expensive, particularly when it is realized that they are usually single purpose machines, i.e., they can be used for making a special coupling tooth only. In addition, due to the often complex configuration of the teeth and amount of machining necessary, it is sometimes difficult to predict with any exactness the length of the completed rotor assembly when all the coupling member and wheel disk teeth have been engaged to form the rotor "spool."

Accordingly, it is the general object of the present invention to provide an improved rotor construction including a simplified coupling means.

A further object of the invention is to provide a rotor construction including improved means for intercoupling a plurality of wheel disks which is less costly and less difficult to machine than known rotor couplings.

A further object of this invention is to provide a rotor assembly including an improved interengaging wheel disk coupling arrangement wherein the overall length of the rotor assembly can be predicted within relatively narrow limits.

Briefly stated, in accordance with a disclosed embodiment of the invention I provide a multistage, axial-flow rotor assembly including a plurality of juxtaposed, blade-carrying wheel disks, each of the disks having a series of axially-directed apertures therein, a plurality of coupling members, each member having a pair of oppositely directed end faces with a series of circumferentially-spaced, axially-extending dowels extending therefrom, the dowels being received in the disk apertures, wherein the overall length of the rotor assembly is determined by the dowel length and the spacing between the end faces and the disks, and means for holding the disks and the coupling members in engagement.

The subject matter which I regard as my invention is particularly pointed out and distinctly claimed in the concluding portion of the specification. This invention, however, both as to organization and construction, together with further objects and advantages thereof, may best be understood by reference to the following description taken in conjunction with the accompanying drawings in which:

FIGURE 1 is an end view along the axis of one of a plurality of wheel disks in turbomachine rotor incorporating my invention;

FIGURE 2 is an enlarged fragmentary perspective view of the rotor wheel disk of FIGURE 1, partially in section, including fragmentary views, partially in section, of a pair of my improved inter-disk coupling members;

FIGURE 3 is an enlarged fragmentary view, partially in section, taken along a radius of the assembled turbomachine rotor and illustrating the manner in which the coupling members of FIGURE 2 abut;

FIGURE 4 is an exploded fragmentary view, partially in section, illustrating a modification of the disk and coupling member arrangement of FIGURES 2 and 3;

FIGURE 5 is a fragmentary view, partially in section, of a further modification of a coupling member adapted for use with the steel disk in FIGURES 2 and 3;

FIGURE 6 is a fragmentary view, partially in section, of another embodiment of the invention; and FIGURE 7 is a fragmentary view, partially in section, of still another embodiment of the invention.

Referring now more particularly to FIGURE 1, numeral 10 indicates generally a rotor wheel disk of a type similar to those used in a typical compressor or turbine rotor. The wheel disk shown includes a rim portion 12, a rib portion 14, a central aperture 16, and an intermediate web portion 18. Attached to the outer periphery of the rim portion of the wheel are a plurality of rotor blades 20. As shown in FIGURE 2, located between the rim portions of adjacent wheel disks are means 22 which, together with the blades, provide a flow-path through the turbomachine. Means 22, sometimes called "spacers," can be of the "floating" type, i.e., not rigidly attached to the rim but held in place by tight fit and centrifugal force with two or more small lugs being used to prevent rotation about the turbomachine axis, or they can serve as heat-shields for the interior portions of the rotor, as is more fully described in my co-pending application entitled "Rotor Assembly," filed February 23, 1961, Serial No. 91,142. As means 22 bear against the disk rims during operation of the rotor they help seal between rotor stages and to maintain the spacing between the disks at the peripheries thereof.

In accordance with the present invention, I provide a pair of coupling members 24—24, as shown in FIGURE 2. Since the coupling members in this embodiment are identical only one will be described. Each coupling member 24 is generally cylindrical in form having a web or body portion 25 and enlarged end flanges, one of which is shown at 26. Extending in an axial direction relative to the rotor are a plurality of dowels 28 which project from face 29 of the end flange. Rib 14 of the wheel disk 10 also has a radial face 30, opposing face 29 on the coupling member 24, in which are provided a plurality of holes 32. The disk rib holes are adapted to receive the dowels 28, with little or no clearance, to the extent described below.

Referring now to FIGURE 3, which shows the rotor parts of FIGURE 2 in an assembled relationship, it will be seen that the dowels 28—28 of adjoining coupling members 24 have their radial end faces 33 in abutment. This is accomplished by rib 14 being slightly less in width than the combined length of the abutting dowels, i.e., the opposing faces 29—29 and 30—30 on the coupling members and disks, respectively, do not quite abut. The number and size of the holes in the wheel disks and, likewise, the corresponding number and size of the coupling member dowels 28, are determined primarily by the torque loads to be transmitted through the coupling, in addition to other design considerations, such as the stresses occurring during operation of the rotor. When assembled, the juxtaposed rotor disks 10 and intermediate coupling members 24 are held in engagement by suitable means such as tie-rods 35 which extend through holes 36 in the wheel disk webs 18. The ends of the tie-rods are machined or otherwise fitted for engagement with fasteners (not shown) to enable the rods to exert pressure in an axial direction on the end disks.

In this manner it will be seen that the overall length of the rotor assembly can be predicted within relatively precise limits because of the abutting of the coupling member dowels at each stage. In comparison, prior means and methods of constructing rotors using interengaging teeth, often have several limits imposed on the size and configuration of the teeth located on the coupling members, as well as on the disks, which can greatly affect the "stack-up" limit of the complete rotor assembly; thus overall dimensions are difficult to hold. For example, with most of the prior art devices utilizing tapered teeth, the limits to which it is desired to keep the slope of the taper of the interengaging wheel and spacer teeth have considerable effect on the overall length of the rotor. This can be an even more important factor in a long, multistage type of turbomachine construction. However, in the present invention the only tolerance of concern is that of the distance between the axially-spaced dowel faces on each member 33—33.

In accordance with the improved coupling arrangement described above, a number of variations in design are possible within the scope of the invention. For example, as shown in FIGURE 4, the dowels may be axially offset (i.e., circumferentially along the torque path) between adjacent couplings. In this embodiment, 44a and 44b comprise a pair of couplings having offset dowels 46a and 46b, respectively. These dowels are adapted to be received in holes 48 in a rib portion 49 of a wheel disk 10. When the rotor is assembled, each of the end faces 50a and 50b on the dowels 46a and 46b, respectively, project through holes 48 in the wheel disk rib 49 to contact the opposing radial faces 52b and 52a, respectively. Thus, when the radial faces are in abutment with the end faces 50a and 50b on the respective coupling members, the only tolerance controlling the size of the rotor will be the dowel length or the axial distance between the dowel faces on each member. Again, the number and size of the dowels and disk holes will depend on the torque loads and stresses likely to be encountered during operation of the particular turbomachine.

A further embodiment of my improved coupling members for use with the wheel disks shown in FIGURES 2, 3, and 4, is shown in FIGURE 5. In this modification, there is provided a coupling member 55 having a cylindrical body or web portion 56. Projecting from the end faces of the body portion, one of which is shown at 57, are a plurality of dowels indicated generally at 58 which are similar to the previously described dowels, except that the radial width (diameter) of each dowel has been foreshortened to the width of the web or body portion. Thus, the coupling member is completely cylindrical in form with semispherical dowels adapted to fit into holes 32, or 48, of the same "diameter." Since the torque is transmitted on a path substantially through the center of the web or body of the coupling member, the presence of a clearance, or gap, between the faces 59—59 of the dowels and the walls of the disk holes 32 or 48 will have no unwarranted effect on the operation of the machine.

One of the more important advantages of the present invention, as compared to certain prior art devices requiring highly complex machining methods, is that the coupling is not restricted to a location substantially inwardly of the disk rim so as to prevent interference with the rim during the making of the dowels, teeth, or as the case may be. In other words, with use of the present invention the dowels and holes can be machined, or otherwise produced, directly under the disk rim or in an enlarged portion thereof, as is more clearly shown in FIGURES 6 and 7. Specifically, in FIGURE 6, indicated generally at 60 is a modified disk having a rim portion 61. Integral with the rim portion is an enlarged rib portion 62 provided with a plurality of holes or pockets 63 which, in this particular embodiment, do not extend entirely through this portion of the wheel disk, although they may do so if desired. Spacers 64 having upper surfaces 65 forming a flow path for the turbomachine are provided. Each of the spacers includes an inwardly directed radial flange portion 66. The flange portion 66 is provided with a series of axially-extending dowels 67 adapted to be received in the pockets 63. In order to provide means for assembling the rotor pairs of axially-aligned dowels 67 of adjacent spacers 64 and the bottom walls of the pockets 63 may be provided with a series of holes arranged in a line to comprise a bore 68. In this way the spacers and disks may be held in engagement by means of a suitable fastening device, such as bolt 69 inserted in the bore, and secured therein by nut 70. Obviously, other means of securing the spacer dowels in the wheel disk rib holes or pockets could be utilized, such as rivets, and the like, or the tie-rods of the previous embodiments could be provided to maintain the disks and spacers in engagement.

On the other hand, if it is desired, a system of staggered dowels and holes, or pockets, may be provided and larger and more positive fastening means than the arrangement in FIGURE 6 utilized. For example, FIGURE 7 shows a modified spacer 72 including an enlarged radially inwardly-extending, elongated flange portion, indicated generally at 73. The radial face of the enlarged flange portion 73 is provided with a plurality of axially-extending dowels 74. The dowels are adapted to be received in holes or pockets 75 in the wheel rib portion 78, which may be located immediately adjacent the disk rim 79, or be integral therewith. A plurality of aligned holes comprising a bore 80 may be provided in the rib and enlarged flange portions of adjacent spacers, inwardly of the dowels, the bore receiving a bolt 81. A nut 82 is provided for securely fastening together the rotor assembly components. The holes—and dowels—may be staggered radially, as shown, or circumferentially as in the embodiment of FIGURE 4.

It will be appreciated that it is within the scope of the present invention to reverse the arrangement of the dowels and holes or pockets, i.e., the ribs of the wheel disks could be provided with machined dowels and the flanges of the coupling members be enlarged to provide holes for receiving the dowels. In accordance with the object of providing a simple, and economical rotor construction, it will be appreciated that the coupling "teeth" can be produced by use of simple machine tools, i.e., the holes in the ribs, or the flanges, can be provided by a simple drilling operation. The hole will either extend completely through the rib, as in the embodiment shown in FIGURE 3, or partially through as in the embodiments shown in FIGURES 6 and 7. To produce the dowels, on the other hand, a hollow drill, or the like, can be utilized. The inner diameter of the hollow drill, of course, will have a dimension equal to, or possibly slightly less than the outer diameter of the solid drill used to produce the holes into which dowels are received. It will be obvious also that the forming or machining operation on the dowels can be accomplished simultaneously, such as by a drill press including a plurality of cutting bits arranged to produce a number of holes and/or the machined dowels. Thus, special machines and tools which can generally only be used in making a particular type of coupling tooth and usually requiring many separate costly and time consuming operations, do not have to be used to make the coupling means of the present invention.

Having thus described the invention what is claimed is:

1. A multistage rotary machine comprising: a plurality of juxtaposed, blade-carrying disk members, each of said disk members including an outer rim portion, a web portion, and a circular rib portion, said rib portion having oppositely disposed radial faces thereon having a series of axially-directed apertures therein; a plurality of generally cylindrical coupling members each having a pair of end flanges and a series of oppositely-directed, axially-extending dowels on each of said end flanges, said dowels being received in said rib apertures, the ends of the dowels of adjacent coupling members being in abutment within the apertures and said radial rib faces being slightly spaced from said end flanges, said coupling members engaging said disk members and transmitting torque therebetween and said abutting dowels determining the overall axial length of said machine; and means for maintaining said disk members and coupling members in engagement, said means including a plurality of tie bolts extending through a series of aligned openings in said disk members.

2. A multistage rotary machine comprising; a plurality of juxtaposed, blade-carrying disk members, each of said disk members including an outer rim portion, a web portion, and a circular rib portion, said rib portion having oppositely disposed radial faces thereon having a series of axially-directed apertures therein; a plurality of generally cylindrical coupling members each having a pair of end flanges with radial faces and a series of oppositely-directed, axially-extending dowels projecting from each of said end flange faces, the dowels on one of a pair of adjacent coupling members being circumferentially offset from the dowels on the other of said pair, the dowels on each of said adjacent pair of coupling members being received in said apertures, with each of said flange faces being slightly spaced from its opposing rib face and said offset dowel ends being in abutment with opposing flange faces so that the overall length of said machine is determined by the length said dowels project from said end faces, said coupling members engaging said disk members and transmitting torque therebetween; and means for maintaining said disk members and coupling members in engagement, said means including a plurality of tie bolts extending through a series of aligned openings in said disk members.

References Cited in the file of this patent

UNITED STATES PATENTS

| | | |
|---|---|---|
| 2,548,886 | Howard | Apr. 17, 1951 |
| 2,654,565 | Feilden | Oct. 6, 1953 |
| 2,662,685 | Blanc | Dec. 15, 1953 |
| 2,803,397 | Gardiner | Aug. 20, 1957 |
| 2,825,124 | Nichols et al. | Mar. 4, 1958 |
| 2,916,256 | Welch | Dec. 8, 1959 |
| 2,988,324 | Sutters | June 13, 1961 |

FOREIGN PATENTS

| | | |
|---|---|---|
| 723,813 | Great Britain | Feb. 9, 1955 |
| 858,763 | Great Britain | Jan. 18, 1961 |
| 1,117,727 | France | May 25, 1956 |

(Corresponding U.S.—2,861,823, Nov. 25, 1958)